US009309814B2

(12) United States Patent
Eser et al.

(10) Patent No.: US 9,309,814 B2
(45) Date of Patent: Apr. 12, 2016

(54) METHOD AND DEVICE FOR CONTROLLING A VARIABLE VALVE TRAIN OF AN INTERNAL COMBUSTION ENGINE

(75) Inventors: Gerhard Eser, Hemau (DE); Josef Kainz, Salching (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 80 days.

(21) Appl. No.: 14/233,978

(22) PCT Filed: Jun. 28, 2012

(86) PCT No.: PCT/EP2012/062604
§ 371 (c)(1),
(2), (4) Date: Jan. 21, 2014

(87) PCT Pub. No.: WO2013/010770
PCT Pub. Date: Jan. 24, 2013

(65) Prior Publication Data
US 2014/0156170 A1 Jun. 5, 2014

(30) Foreign Application Priority Data

Jul. 19, 2011 (DE) .......................... 10 2011 079 436

(51) Int. Cl.
*F02D 13/02* (2006.01)
*F02D 41/00* (2006.01)
*F02D 41/14* (2006.01)

(52) U.S. Cl.
CPC ........ *F02D 13/0226* (2013.01); *F02D 41/0085* (2013.01); *F02D 41/1498* (2013.01); *F02D 13/0207* (2013.01); *Y02T 10/18* (2013.01)

(58) Field of Classification Search
CPC ............ F02D 13/0226; F02D 41/0085; F02D 41/1498; F02D 13/0207; F02D 13/0223; Y02T 10/18; G01F 5/00
USPC .......... 701/103, 111, 114; 123/436, 345–346, 123/325, 672–673, 690, 479; 73/114.02, 73/114.45, 114.32, 114.31
See application file for complete search history.

(56) References Cited

U.S. PATENT DOCUMENTS 4,197,767 A * 4/1980 Leung .............................. 477/98
5,526,793 A * 6/1996 Johansson ..................... 123/481
(Continued)

FOREIGN PATENT DOCUMENTS

| DE | 10046221 A1 | 10/2002 | .............. F01L 13/00 |
| DE | 102006016020 B3 | 2/2007 | .............. F02D 33/00 |

(Continued)

OTHER PUBLICATIONS

International Search Report and Written Opinion, Application No. PCT/EP2012/062604, 10 pages, Nov. 7, 2012.
(Continued)

*Primary Examiner* — Stephen K Cronin
*Assistant Examiner* — Susan E Scharpf
(74) *Attorney, Agent, or Firm* — Slayden Grubert Beard PLLC

(57) ABSTRACT

A method for controlling a variable valve train of an internal combustion engine including multiple cylinders is disclosed. At a first operating point of the engine, an intake air amount is determined and cylinder-individual values for a fuel amount reduction are determined by successively reducing the respectively supplied fuel amount for each cylinder until a characteristic representing uneven running of the engine has reached a predetermined uneven running threshold value. A ratio of a change in the intake valve lift to the resulting change in the intake air amount is determined for the first operating point. Cylinder-individual deviations of the intake valve lift from a reference value are determined based on the ratio, the intake air amount at the first operating point, and the associated value for the fuel amount reduction. The variable valve train is then controlled on the basis of the cylinder-individual deviations of the intake valve lift.

10 Claims, 3 Drawing Sheets

(56) References Cited

U.S. PATENT DOCUMENTS

| | | | | |
|---|---|---|---|---|
| 5,861,553 | A * | 1/1999 | Janetzke et al. | 73/114.04 |
| 6,209,519 | B1 * | 4/2001 | Melchior et al. | 123/406.24 |
| 6,584,834 | B1 * | 7/2003 | Lehner et al. | 73/114.08 |
| 6,666,197 | B2 | 12/2003 | Bayer | 123/672 |
| 6,691,022 | B2 * | 2/2004 | Takemura | F01L 13/0021 123/90.15 |
| 6,694,960 | B2 | 2/2004 | Hess et al. | 123/673 |
| 6,848,301 | B2 * | 2/2005 | Kondo | 73/114.33 |
| 6,898,927 | B2 * | 5/2005 | Morinaga et al. | 60/284 |
| 6,971,350 | B2 * | 12/2005 | Akasaka et al. | 123/90.16 |
| 7,270,095 | B2 * | 9/2007 | Tsunooka et al. | 123/90.15 |
| 7,497,210 | B2 * | 3/2009 | Okamoto | 123/673 |
| 7,658,178 | B2 * | 2/2010 | DeGroot et al. | 123/406.24 |
| 7,703,437 | B2 * | 4/2010 | Scheffler et al. | 123/406.14 |
| 2006/0224297 | A1 * | 10/2006 | Kabele | 701/111 |
| 2009/0093948 | A1 * | 4/2009 | Richert et al. | 701/103 |

FOREIGN PATENT DOCUMENTS

| | | | | |
|---|---|---|---|---|
| DE | 102006026390 A1 | 12/2007 | | F02D 41/14 |
| DE | 102006058571 A1 | 6/2008 | | F02D 13/02 |
| DE | 102009046759 A1 | 5/2011 | | F02D 41/00 |
| EP | 0833043 A1 | 4/1998 | | F02B 75/20 |
| WO | 01/59282 A1 | 8/2001 | | F02D 41/00 |
| WO | 2013/010770 A1 | 1/2013 | | F02D 13/02 |

OTHER PUBLICATIONS

Chinese Office Action, Application No. 201280035747.X, 14 pages, Oct. 30, 2015.

* cited by examiner

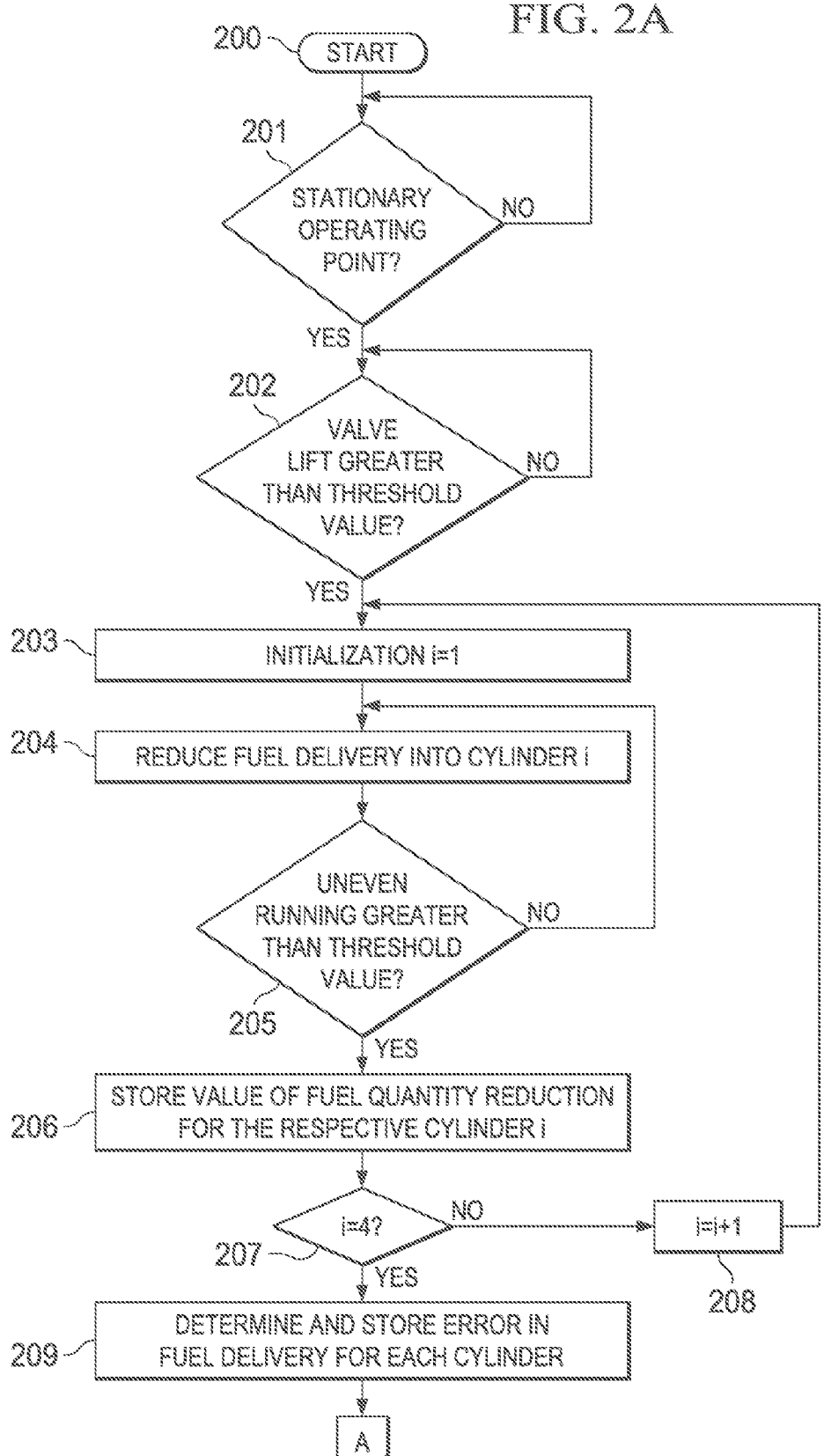

METHOD AND DEVICE FOR CONTROLLING A VARIABLE VALVE TRAIN OF AN INTERNAL COMBUSTION ENGINE

CROSS-REFERENCE TO RELATED APPLICATIONS

This application is a U.S. National Stage Application of International Application No. PCT/EP2012/062604 filed Jun. 28, 2012, which designates the United States of America, and claims priority to DE Application No. 10 2011 079 436.0 filed Jul. 19, 2011, the contents of which are hereby incorporated by reference in their entirety.

TECHNICAL FIELD

The invention relates to a method and a device for controlling a variable valve train of an internal combustion engine with a plurality of cylinders.

BACKGROUND

In an effort to further reduce the fuel consumption and the harmful emissions of modern internal combustion engines, internal combustion engines with variable valve trains for variable control of the inlet valves and/or the exhaust valves are increasingly coming into use. In this regard internal combustion engines with variable valve lift control have proved particularly efficient, because they can be operated almost unthrottled in the lower and medium load range (throttle valve fully open). The load control only takes place thereby over the lift of the inlet valves. In said unthrottled operating range the charge exchange losses are low, resulting in reduced consumption. However, manufacturing tolerances in the valve train and in the valves cause errors in cylinder filling. Especially in the lower load range and when idling, where the lift of the inlet valves in the unthrottled mode is very small, even small errors in cylinder filling can be evident as noticeable torque differences, which restricts ride comfort. Said torque differences, which can occur not only between different internal combustion engines but also between the cylinders of the same internal combustion engine, lead in the worst case to noticeable uneven running in the lower load range or when idling and hence to a restriction of the ride comfort.

SUMMARY

One embodiment provides a method for controlling a variable valve train of an internal combustion engine with a plurality of cylinders, comprising: determining an intake air quantity at a first operating point of the internal combustion engine, at the first operating point, determining cylinder-specific values for a reduction of the fuel quantity by successively reducing the respective delivered quantity of fuel for each cylinder until a parameter representing the uneven running of the internal combustion engine has reached a specified uneven running limit value, determining a ratio of a change of the inlet valve lift to a resulting change of the intake air quantity for the first operating point, determining cylinder-specific deviations of the inlet valve lift from a valve reference value based on the ratio, the intake air quantity at the first operating point, and the associated fuel quantity reduction value, and controlling the variable valve train based at least one the cylinder-specific deviations of the inlet valve lift.

In a further embodiment, the method includes at a second operating point of the internal combustion engine, at which the inlet valve lift is greater than at the first operating point, determining other cylinder-specific values for a reduction of fuel quantity by successively reducing the respective quantity of fuel delivered for each cylinder until a parameter representing the uneven running of the internal combustion engine has reached a specified uneven running limit value, determining cylinder-specific errors in the fuel delivery based on the other cylinder-specific values for the reduction of fuel quantity and a fuel reference value, and wherein the cylinder-specific errors in the fuel delivery are taken into account during determination of the cylinder-specific values of the reduction of the fuel quantity at the first operating point.

In a further embodiment, the valve train of the internal combustion engine is configured for cylinder-specific control of the lift of the inlet valves of the internal combustion engine and the valve train is controlled such that the cylinder specific deviations of the inlet valve lift are reduced or approach each other.

In a further embodiment, the valve train of the internal combustion engine is configured for common control of the lift of the inlet valves of the internal combustion engine, and the method further comprises determining differences between the cylinder-specific deviations of the inlet valve lift are determined, and determining a control variable for the minimum lift of the inlet valves to be set by the valve train based at least on the determined differences.

In a further embodiment, the cylinder-specific deviations of the inlet valve lift are taken into account for cylinder-specific fuel delivery.

In a further embodiment, a control device is provided for an internal combustion engine with a plurality of inlet valves and a device for varying the lift of the inlet valves, wherein the control device is programmed to control a variable valve train of an internal combustion engine with a plurality of cylinders by: determining an intake air quantity at a first operating point of the internal combustion engine, at the first operating point, determining cylinder-specific values for a reduction of the fuel quantity by successively reducing the respective delivered quantity of fuel for each cylinder until a parameter representing the uneven running of the internal combustion engine has reached a specified uneven running limit value, determining a ratio of a change of the inlet valve lift to a resulting change of the intake air quantity for the first operating point, determining cylinder-specific deviations of the inlet valve lift from a valve reference value based on the ratio, the intake air quantity at the first operating point, and the associated fuel quantity reduction value, and controlling the variable valve train based at least one the cylinder-specific deviations of the inlet valve lift.

BRIEF DESCRIPTION OF THE DRAWINGS

Example embodiments of the invention are explained in detail below using with reference to the accompanying figures, in which:

FIGS. 2A, 2B show an exemplary embodiment of a control method in the form of a flow chart.

DETAILED DESCRIPTION

Figure 1:
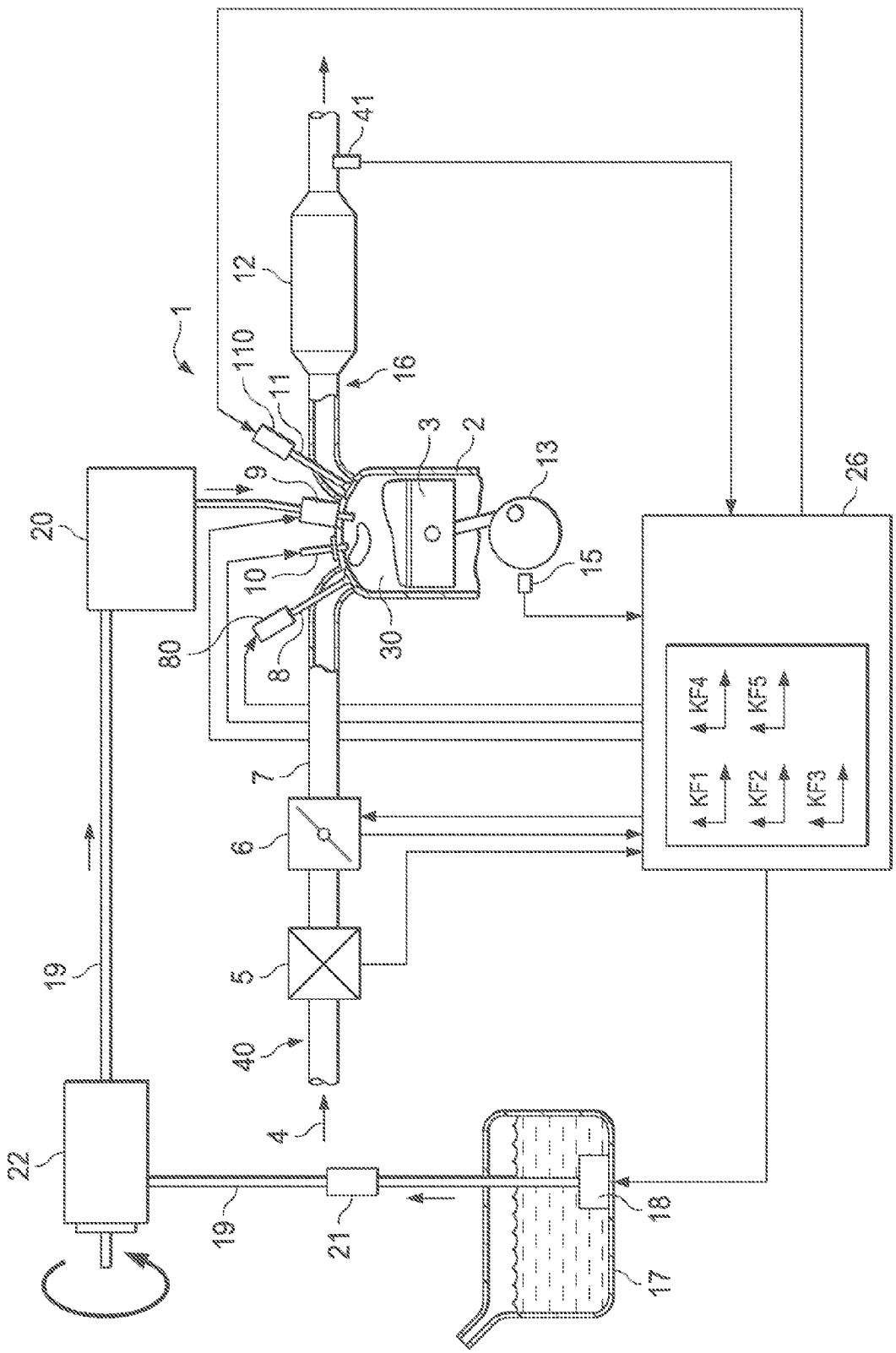
FIG. 1 shows a schematic representation of an internal combustion engine.

Embodiments of the present invention provide a method and a device for controlling a variable valve train of an internal combustion engine with a plurality of cylinders, with which the potential of said internal combustion engines for fuel saving can be better utilized while preserving the ride comfort.

Some embodiments provide a method for controlling a variable valve train of an internal combustion engine with a plurality of cylinders. According to this an intake air quantity is determined at a first operating point of the internal combustion engine. At the first operating point, furthermore, cylinder-specific values for a reduction of the fuel quantity are determined by successively reducing the respective delivered quantity of fuel for each cylinder until a parameter representing the uneven running of the internal combustion engine has reached a specified uneven running limit value. Furthermore, a ratio of a change of the inlet valve lift to the resulting change of the intake air quantity for the first operating point is determined. Deviations of the inlet valve lift from a valve reference value are determined for each cylinder based on said ratio, the intake air quantity at the first operating point and the associated value for the reduction of the fuel quantity. The variable valve train is then controlled taking into account the cylinder-specific deviations of the inlet valve lift.

Cylinder-specific deviations in the lift of the inlet valves are primarily due to manufacturing tolerances in the valve train (valve control mechanism) and to tolerances in the valves themselves. Embodiments of the invention are based on the idea that the cylinder-specific deviations of the lift of the inlet valves are determined qualitatively and quantitatively by reducing the cylinder-specific quantity of fuel delivered until reaching a specified uneven running value. The more the delivered quantity of fuel has to be reduced until uneven running is reached, the more intake air is delivered to the respective cylinder and the greater is the lift of the inlet valve. Conversely, the less the delivered quantity of fuel has to be reduced until reaching the uneven running value, the less intake air is delivered to the respective cylinder and the smaller is the inlet valve lift. The cylinder-specific values of the reduction of fuel quantity therefore represent a measure of the intake air filling of the cylinder and thus of the inlet valve lift. Thus conclusions can be drawn as to the accuracy or the possible cylinder-specific tolerances when setting the inlet valve lift. Taking into account said cylinder-specific values for the reduction of the fuel quantity, the variable valve train can be optimally controlled in respect of the ride comfort and of the fuel consumption.

Especially in the low load range (e.g. idling) and for small inlet valve lifts, small changes of inlet valve lift cause relatively significant changes of the intake air quantity. The functional relationship between the intake air quantity and the inlet valve lift therefore has a large gradient in the low load range and can therefore be determined very well by measurement. Cylinder-specific errors/deviations of the inlet valve lift can thus be determined with good accuracy based on the ratio of the change of the inlet valve lift to the resulting change of the intake air quantity, the intake air quantity and the cylinder-specific values for the reduction of the fuel quantity at a specific operating point, and the control of the valve train can be correspondingly optimized. In one embodiment of the method, other cylinder-specific values for a reduction of fuel quantity are determined at a second operating point of the internal combustion engine, at which the inlet valve lift is greater than at the first operating point. For this purpose, the respective delivered quantity of fuel for each cylinder is successively reduced until a parameter representing the uneven running of the internal combustion engine has reached a specified uneven running limit value. Cylinder-specific errors in the fuel delivery are determined based on the other cylinder-specific values for the reduction of the fuel quantity and a specified fuel reference value. The cylinder-specific errors in the fuel delivery are then taken into account during determination of the cylinder-specific values of the reduction of the fuel quantity at the first operating point.

Because the delivered quantity of fuel is reduced for quantitative and qualitative determination of the errors in the cylinder filling, manufacturing tolerances of the fuel supply system, especially the injection valves, influence the accuracy of the method. In order to quantify said errors in the fuel delivery as accurately as possible, the cylinder-specific delivered quantities of fuel at a second operating point are reduced until another uneven running limit value is reached. The cylinder-specific values of said reduction of fuel quantity are then compared with a suitable fuel reference value. The fuel reference value can be e.g. an average value of the cylinder-specific values of the reduction of the quantity of fuel or a corresponding value provided by the manufacturer of the fuel supply system. Advantageously, there is a cylinder-specific percentage error in the fuel delivery caused by tolerances in the fuel supply system. Said errors are then taken into account when determining the values of the reduction of fuel quantity at the first operating point, which improves the accuracy of the method.

The second operating point is advantageously selected such that the influence of errors in fuel delivery caused by cylinder-specific tolerances of the fuel supply system on the torque produced by specific cylinders dominates in comparison with the influence of errors in the intake air filling caused by cylinder-specific tolerances of the valve train.

The first operating point is advantageously selected such that the influence of specific cylinders on fuel delivery caused by cylinder-specific tolerances of the fuel supply system on the torque produced by specific cylinders is negligible in comparison with the influence of errors in the intake air filling caused by cylinder-specific tolerances of the valve train.

As a result, a superimposition of the influences is largely avoided. For example, the inlet valves achieve their maximum possible lift and/or their maximum opening duration at the second operating point. In contrast, the lifts and/or the opening times of the inlet valves are rather small at the first operating point. This is because the influence of errors in the cylinder filling caused by tolerances in the valve train on the torque decreases with increasing cylinder filling, whereas the influence of errors in the fuel delivery on the torque increases with increasing cylinder filling.

In one embodiment of the method, the valve train of the internal combustion engine is designed for cylinder-specific control of the lift of the inlet valves of the internal combustion engine. The valve train is controlled such that the cylinder-specific deviations of the inlet valve lift are reduced.

The valve train can e.g. comprise an electromagnetic or pneumatic mechanism for cylinder-specific control of the inlet valves. The lift of the inlet valves can be varied cylinder-specifically with such mechanisms. Knowing the cylinder-specific deviations of the inlet valve lift enables the valve train to be controlled such that said deviations are reduced. As a result, the cylinder-specific intake air quantities can be set equal.

One embodiment of the method is aimed at a valve train for common control of the lift of the inlet valves of the internal combustion engine. Differences between the cylinder-specific deviations of the inlet valve lift are determined. A control value for the minimum lift of the inlet valves to be set by the valve train is then determined depending on the greatest difference in magnitude.

The greatest difference in magnitude between the cylinder-specific deviations of the individual cylinders is a measure of the scatter (maximum differences) of the delivery of intake air in the individual combustion chambers and thus of the scatter of the torque contributions of the individual cylinders. In the event of a very large difference magnitude, resulting strong torque differences between the cylinders and a tendency to uneven engine running are therefore likely. If the greatest difference exceeds e.g. a specified upper threshold value, then the set value for the minimum inlet valve lift can be increased, whereby this improves the uneven running. If the greatest difference lies below a specified lower threshold value then the set value for the minimum inlet valve lift can be reduced, resulting in consumption advantages without a noticeable worsening of the uneven running.

In one embodiment of the method, the cylinder-specific deviations of the inlet valve lift are taken into account for cylinder-specific fuel delivery.

This enables a negative influence of the deviations of the inlet valve lift on the exhaust gas composition and on the torque produced by specific cylinders to be compensated.

Other embodiments provide a control device for an internal combustion engine with a plurality of cylinders and a plurality of inlet valves and a device for varying the lift of the inlet valves is designed and provided with means such that it can implement any of the methods disclosed herein.

An internal combustion engine 1 is schematically illustrated in FIG. 1.

The internal combustion engine 1 comprises four cylinders 2, wherein only one cylinder is illustrated for better comprehension. The description for said cylinder applies analogously to the other cylinders. In cylinder 2 a piston 3 is disposed that can move up and down in the cylinder 2. The internal combustion engine 1 also comprises an intake tract 40, in which an intake opening 4 for inducing intake air, an air flow sensor 5, a throttle valve 6 and a suction pipe 7 are disposed in the downstream direction. The induction tract 40 opens into a combustion chamber 30 delimited by the cylinder 2 and the piston 3. The intake air required for combustion is introduced into the combustion chamber 30 via the intake tract 40, wherein the delivery of intake air is controlled by opening and closing at least one inlet valve 8.

The internal combustion engine 1 illustrated here is an internal combustion engine 1 with direct fuel injection, wherein the fuel necessary for the combustion is injected (electromagnetically or piezoelectrically) directly into the combustion chamber 30 by means of an injection valve 9. An ignition plug 10 also protruding into the combustion chamber is used to ignite combustion. The exhaust gases of combustion are discharged via an exhaust valve 11 into an exhaust tract 16 of the internal combustion engine 1 and cleaned by means of an exhaust gas catalyzer 12.

A lambda sensor 41 for recording the oxygen content of the exhaust gas is also disposed in the exhaust tract.

The internal combustion engine comprises a valve train 80 for variable control of the inlet valves 8. The internal combustion engine can furthermore comprise a valve train 110 for variable control of the exhaust valves 11 (said configuration is, however, not considered below). The valve train 80 can be designed for cylinder-specific control or for common control of the inlet valves 8. For this purpose, the valve train 80 can comprise an electromagnetic, electrical or pneumatic mechanism. The valve train 80 can thereby vary at least one operating parameter of the inlet valves that influences the cylinder filling, especially the lift of the inlet valves 8.

The transfer of force to a drive train of the motor vehicle (not illustrated) takes place via a crankshaft 13 coupled to the piston 3. The internal combustion engine 1 also has an integrated crankshaft sensor 15 for recording the position and revolution rate of the crankshaft 13.

The internal combustion engine 1 comprises a fuel supply system comprising a fuel tank 17 and a fuel pump 18 disposed therein. The fuel is delivered by means of the fuel pump 18 via a supply line 19 to a pressure reservoir 20. This is a common pressure reservoir 20, from which the injection valves 9 for a plurality of cylinders 2 are supplied with pressurized fuel. A fuel filter 21 and a high pressure pump 22 are also disposed in the supply line 19. The high pressure pump 22 is used to deliver the fuel provided by the fuel pump 18 at relatively low pressure (approx. 3-5 bar) to the pressure reservoir 20 at high pressure (typically of the order of 120-150 bar).

The internal combustion engine 1 has an associated control device 26 that is connected via signal and data lines (shown in FIG. 1 by arrows) to all actuators and sensors of the internal combustion engine 1. Control functions KF1 to KF5 based on characteristic fields are implemented in software form in the control device 26. For this purpose, the control device comprises a data memory and a microprocessor (not illustrated). Based on the measurement values of the sensors and the engine control functions based on characteristic fields, control signals are sent to the actuators of the internal combustion engine 1 and of the fuel supply system. Specifically, the control device 26 is coupled via data and signal lines to the fuel pump 18, to the air flow sensor 5, to the throttle valve 6, to the ignition plug 10, to the injection valves 9, to the variable valve train 80 (possibly also to the valve train 110), to the crankshaft sensor 15 and to the lambda sensor 41.

The control device 26 is designed to generate control signals for opening and closing the injection valve 9. The control signals are transmitted to the electromagnetic or piezoelectric actuators of the injection valves 9 via the corresponding signal lines (shown in FIG. 1 by arrows). The control device 26 is also designed to control the valve train (possibly also the valve train 110) for this purpose so as to vary the operating parameters of the valve train 80, which have an influence on the cylinder filling, especially the lift of the inlet valves 8. The control device is designed such that it can implement a control method as disclosed herein for the valve train 80 (110), as is described by way of example using FIGS. 2A and 2B.

Figure 2B:
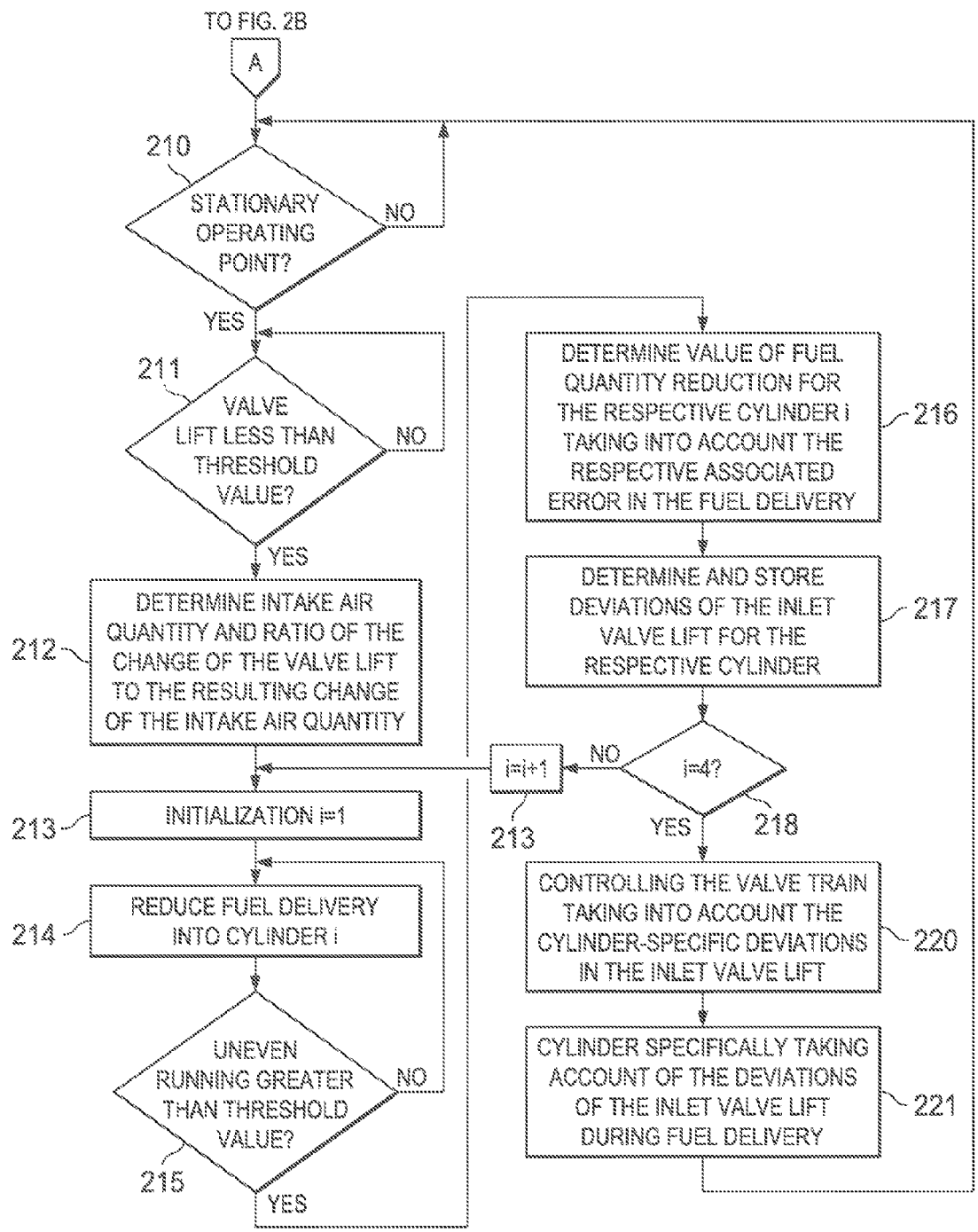

In FIGS. 2A and 2B an exemplary embodiment of a method for controlling the variable valve train of an internal combustion engine with four cylinders, as shown by way of example in FIG. 1, is shown in the form of a flow chart.

The method is implemented by the control functions KF1 to KF5 (see FIG. 1) implemented in the control device 26.

The method starts with step 200 (see FIG. 2A) e.g. with starting of the internal combustion engine 1 by a vehicle driver (not illustrated). From the start the revolution rate or the air flow is continuously measured by the crankshaft sensor 15 or the air flow sensor 5.

The method continues with step 201, in which a check is made as to whether a stationary operating point of the internal combustion engine 1 exists. For this purpose, it can e.g. be checked whether the revolution rate and the delivered intake air quantity (induction air quantity) are within specified value windows over a specified period. This check is repeated until a stationary operating point is detected.

Thereupon the method continues with step 202, in which a check is made as to whether the lift of the inlet valves 8 (an operating parameter of the valve train 80 that influences the cylinder filling) is greater than a specified threshold value. The check is repeated until the condition of step 202 is fulfilled. In the event of a positive result of the check in step 202, the internal combustion engine 1 is thus being operated at a stationary operating point, wherein the lift of the inlet valves is greater than a specified threshold value. Said operating point is then referred to as a second operating point. The threshold value for the valve train 80 operating parameter is thereby dimensioned such that at the second operating point the influence of errors in fuel delivery (caused by cylinder-specific tolerances of the fuel supply system, especially of the injection valves 9) on the torque produced by individual cylinders dominates compared to the influence of errors in the intake air filling (caused by cylinder-specific tolerances of the valve train).

As a result, a superimposition of influences is substantially avoided. Advantageously, the inlet valves 8 reach their maximum possible lift at the second operating point.

The method continues with step 203, in which a numerical variable i, which can adopt integer values between 1 and the number of cylinders of the internal combustion engine, is initialized with the value 1. In the exemplary embodiment the numerical variable i can thus adopt integer values between 1 and 4 because it is a four-cylinder engine.

The method continues with step 204, in which the quantity of fuel delivered to the respective cylinder i is reduced by a specified amount. For this purpose, the injection valve 9 associated with the respective cylinder i is correspondingly controlled by the control device 26, e.g. by reducing the opening time of the injection valve 9 by means of a correspondingly reduced energization time.

The method continues with step 205, in which it is checked whether a torque change caused by means of the reduction of the quantity of fuel in cylinder i leads to uneven running that is greater than a specified threshold value. For this purpose, a parameter or operating variable representing the uneven running is compared with a specified threshold value. The parameter can e.g. be determined from the signal of the crankshaft sensor 15. Thus e.g. revolution rate fluctuations or the acceleration of the crankshaft 13 can be determined from the signal of the crankshaft sensor 15 in a segment synchronous manner, so that conclusions regarding the cylinder-specific torque contributions and thus regarding the uneven running are possible. The parameter is compared with the threshold value. The threshold value for uneven running is thereby to be specified such that there is no unacceptable adverse effect on comfort for the driver. Process step 204 is repeated until the check in step 205 can produce a positive result. Through the ever greater reduction in the quantity of fuel delivered to the cylinder i the fuel mixture in said cylinder i is ever more weakened until corresponding uneven running occurs.

The method then continues with step 206, in which the fuel quantity reduction value for the respective cylinder 2 is stored until reaching/exceeding the uneven running threshold value.

The method continues with step 207, in which a check is made as to whether the counter i has already reached the number (four) of cylinders 2 of the internal combustion engine 1. If this is not the case, the numerical variable i is incremented by 1 in step 208 and the method continues with step 204. The method steps 204 to 208 are thus carried out for each cylinder 2 of the internal combustion engine 1, so that in the end the respective fuel quantity reduction value is determined and stored for each cylinder 2 until the uneven running threshold value is reached.

In the event of a positive result of the check in step 207, the method continues with step 209, in which for each cylinder 2 an error in the fuel delivery is determined based on the respective cylinder-specific fuel quantity reduction value and a specified fuel reference value and is stored. The fuel reference value can e.g. be the arithmetic mean of the cylinder-specific values for fuel quantity reduction at the second operating point or corresponding information provided by the manufacturer of the fuel supply system. The cylinder-specific errors in the fuel delivery for the respective cylinder can e.g. be formed based on the quotients of the respective cylinder-specific fuel quantity reduction value and the fuel reference value. As a result, advantageously a cylinder-specific percentage error in fuel delivery occurs, which is caused by tolerances in the fuel supply system (especially tolerances in the injection valves 9).

Said cylinder-specific errors in fuel delivery reflect manufacturing or ageing related inaccuracies in fuel delivery for each cylinder 2. The errors in fuel delivery are therefore especially based on tolerances in the injection valves 9. The determination of said cylinder-specific errors in fuel delivery is used to improve the accuracy of the entire method, as is clear from the following statements.

The method continues with step 210 (see FIG. 2B), in which a check is again made as to whether the internal combustion engine 1 is at a stationary operating point. For an accurate explanation of this check reference is made to the explanation of step 201. The check is repeated until a stationary operating point is detected.

The method continues with step 211, in which a check is made as to whether the lift of the inlet valves 9 is smaller than a specified threshold value. The threshold value for the lift of the inlet valves 9 is dimensioned here such that the influence of cylinder filling errors on the torque produced by specific cylinders caused by cylinder-specific tolerances of the valve train 80 dominates in comparison with the influence of errors in fuel delivery caused by cylinder-specific tolerances of the fuel supply system. As a result, a superimposition of the influences is largely avoided. The check in step 211 is repeated until there is a positives result. In the event of a positive result of the check in step 211 the internal combustion engine 1 is thus being operated at a stationary operating point and the lift of the inlet valves 9 is smaller than the specified threshold value. Said operating point is subsequently referred to as the first operating point.

The method now continues with step 212, wherein the intake air quantity at the first operating point and a ratio of the change of the lift of the inlet valves 9 to the resulting change of the intake air quantity introduced into the cylinders at the first operating point are determined. The intake air quantity can be determined by means of the air flow sensor 5. The ratio of the change of the lift of the inlet valves 9 to the resulting change of the intake air quantity introduced into the cylinders for the first operating point can be calculated based on physical models (suction pipe model) implemented in the control device or can be determined based on data placed in a characteristic field. The data input of the characteristic field takes place e.g. empirically by means of suitable test series or using computer models. Corresponding values are determined depending on the operating point. The ratio essentially states the extent to which the intake air quantity in a cylinder 2 changes depending on the lift of the respective inlet valve 9 at a defined operating point of the internal combustion engine 1. Just in the lower load range and when idling, small changes in the lift of the inlet valve 9 cause a significant change in the intake air quantity (and hence of the torque) in the cylinders 2, so that the intake air quantity reacts very sensitively to such changes. The modeling of the relationship or of its empirical determination in laboratory tests for various load points is therefore resilient to errors and precise.

Steps 213 to 215 now follow, which run in the same way as steps 203 to 205. Regarding the exact procedure, reference is therefore made to the explanations for steps 203 to 205.

In the event of a positive result of the check in step 215, the method continues with step 216, in which for the respective cylinder i the value for the reduction of the fuel quantity until reaching the threshold value for uneven running is determined. However, this takes place advantageously taking into account the error in fuel delivery determined in step 209 for the respective cylinder i. For this purpose the determined cylinder-specific value for the reduction of the fuel quantity at the first operating point is corrected by the associated cylinder-specific error in fuel delivery determined in step 209. Said correction results in an increase in the accuracy of the method, because in this way the cylinder-specific errors in fuel delivery, which are due to manufacturing tolerances in the injection valves, are neutralized. The corrected cylinder-specific value for the reduction of the fuel quantity at the first operating point for the respective cylinder 2 is then stored.

The method continues with step 217, in which the cylinder-specific deviation of the lift of the respective inlet valve 9 is determined from another reference value based on the above-mentioned ratio, the intake air quantity at the first operating point and the respective associated corrected value for the reduction of the fuel quantity (see step 216). The further reference value can e.g. be the average lift value of all the inlet valves of the internal combustion engine at the first operating point. The determination of said deviations can take place according to the following relationship to a good approximation (Taylor first order):

$$HUB\_DIF_i = \left(\frac{\Delta HUB}{\Delta MAF}\right)_1 \times MAF \times \Delta\lambda_i$$

Here $HUB\_DIF_i$ is the deviation of the lift of the inlet valve of the cylinder i from a valve reference value, $$\left(\frac{\Delta HUB}{\Delta MAF}\right)_1$$

is the ratio of the change of the lift of the inlet valves 9 to the resulting change of the intake air quantity delivered into the cylinders 2 at the first operating point (see step 212), MAF is the intake air quantity of the internal combustion engine at the first operating point (see step 212) and $\Delta\lambda_1$ is the percentage cylinder-specific change of the exhaust composition for the respective cylinder i resulting from the deviation of the lift of the respective inlet valve of the cylinder i from the valve reference value. $\Delta\lambda_i$ can be determined for each cylinder based on the respectively associated, corrected value for the reduction of the fuel quantity at the first operating point.

This will be explained using the following example for an internal combustion engine with four cylinders (i=4):

Assuming passing through steps 213 to 215 for all four cylinders, the following cylinder-specific values result for the reduction of the fuel quantity:

Cylinder i=1: The delivered quantity of fuel had to be reduced by 20% in order to exceed the uneven running threshold value.

Cylinder i=2: The delivered quantity of fuel had to be reduced by 15% in order to exceed the uneven running threshold value.

Cylinder i=3: The delivered quantity of fuel had to be reduced by 10% in order to exceed the uneven running threshold value.

Cylinder i=4: The delivered quantity of fuel had to be reduced by 5% in order to exceed the uneven running threshold value.

The average value of all cylinder-specific values for the reduction of fuel quantity is therefore 12.5%.

For cylinder i=1 there is a deviation from said average value of +7.5%.

For cylinder i=2 there is a deviation from said average value of +2.5%.

For cylinder i=3 there is a deviation from said average value of −2.5%.

For cylinder i=4 there is a deviation from said average value of −7.5%.

Because for cylinders i=1 and i=2 more fuel had to be reduced relative to the average value, it can be concluded that the fuel mixture was richer (richer fuel). From that it can be concluded that relatively less combustion air was delivered to said cylinders. This leads to the conclusion that the lifts of the inlet valves of said cylinders were rather smaller, i.e. scatter towards lower lift values.

Because for cylinders i=3 and i=4 less fuel had to be reduced relative to the average value, it can be concluded that the fuel mixture was leaner (i.e. leaner fuel). From this it can be concluded that relatively more combustion air was delivered into said cylinders. This leads to the conclusion that the lifts of the inlet valves of said cylinders were rather greater, i.e. scattering towards greater lift values.

Because of the proportional relationship (with sign reversal) between the cylinder-specific quantity of fuel and the cylinder-specific exhaust gas composition, the following occur for:

Cylinder i=1: $\Delta\lambda_1 = -7.5\%$
Cylinder i=2: $\Delta\lambda_2 = -2.5\%$
Cylinder i=3: $\Delta\lambda_3 = +2.5\%$
Cylinder i=4: $\Delta\lambda_4 = +7.5\%$ If the values for $\Delta\lambda_i$ are known then the respective deviation $HUB\_DIF_i$ of the lift of the respective inlet valve can then be calculated for each cylinder.

This method allows determination of the deviations of the lift of the inlet valves relative to a reference value with very low computer resource usage.

The method continues with steps 218 and 219, wherein here reference is made to the explanations for steps 207 and 208.

Following a positive result of the check in step 218, when the (percentage) deviations of the lifts of the inlet valves are thus determined for all cylinders, the method continues with step 220, in which at least one control variable of the valve train 8, advantageously the lift of the inlet valves, is adjusted based on these cylinder-specific deviations.

If the valve train 80 is designed for cylinder-specific control of the inlet valves 8, then the valve train can be controlled such that the cylinder-specific deviations $HUB\_DIF_i$ in the lift of the inlet valves are reduced, set approximately equal to each other or set equal to each other. As a result, uniform and precise cylinder filling can be achieved.

If the valve train is designed for common control of the inlet valves 2, then differences between the cylinder-specific deviations $HUB\_DIF_i$ of the lifts of the inlet valves are determined. For example, differences between these values can be formed. A control value of the valve train, especially the minimum inlet valve lift to be set, is adjusted depending on the greatest difference in magnitude. The greater the difference between the cylinder-specific deviations, the greater are the differences in filling of the individual cylinders and the further to be increased is the value for the minimum valve lift to be set in order to avoid uncomfortable running behavior of the internal combustion engine. As a result, the operating range for optimum consumption at low loads and when idling can be set optimally and selectively for each internal combustion engine.

The method continues with step 221, in which the cylinder-specific deviations of the inlet valve lifts during fuel delivery are taken into account. If it is e.g. determined that there is 10% more filling of a cylinder as a result of the deviations in the lift of the inlet valves, the quantity of fuel delivered via the respective injection valve is increased accordingly. As a result, the cylinder-specific exhaust gas values can be optimized.

At this point the method can be repeated for another operating point starting from step 210. After many runs through for different operating points the valve train is optimized for a wide operating range.

Even when the invention was explained for an internal combustion engine with direct fuel injection, it is explicitly stated that the invention is not restricted to internal combustion engines with direct fuel injection. The invention is also applicable to internal combustion engines with intake pipe injection, in which the fuel delivery can be controlled for specific cylinders. This is e.g. possible for an internal combustion engine having an injection valve per cylinder disposed in its intake manifold. The invention can be analogously transferred to such internal combustion engines with intake pipe injection.

What is claimed is:

1. A method for controlling a variable valve train of an internal combustion engine with a plurality of cylinders, comprising:
   determining an intake air quantity at a first operating point of the internal combustion engine,
   at the first operating point, determining cylinder-specific values for a reduction of the fuel quantity by successively reducing the respective delivered quantity of fuel for each cylinder until a parameter representing the uneven running of the internal combustion engine has reached a specified uneven running limit value,
   determining a ratio of a change of the inlet valve lift to a resulting change of the intake air quantity for the first operating point,
   determining cylinder-specific deviations of the inlet valve lift from a valve reference value based on the ratio, the intake air quantity at the first operating point, and the associated fuel quantity reduction value, and
   controlling the variable valve train based on at least one of the cylinder-specific deviations of the inlet valve lift.

2. The method of claim 1, comprising:
   at a second operating point of the internal combustion engine, at which the inlet valve lift is greater than at the first operating point, determining other cylinder-specific values for a reduction of fuel quantity by successively reducing the respective quantity of fuel delivered for each cylinder until a parameter representing the uneven running of the internal combustion engine has reached a specified uneven running limit value,
   determining cylinder-specific errors in the fuel delivery based on the other cylinder-specific values for the reduction of fuel quantity and a fuel reference value, and
   wherein the cylinder-specific errors in the fuel delivery are taken into account during determination of the cylinder-specific values of the reduction of the fuel quantity at the first operating point.

3. The method of claim 1, wherein the valve train of the internal combustion engine is configured for cylinder-specific control of the lift of the inlet valves of the internal combustion engine and the valve train is controlled such that the cylinder specific deviations of the inlet valve lift are reduced or approach each other.

4. The method of claim 1, wherein the valve train of the internal combustion engine is configured for common control of the lift of the inlet valves of the internal combustion engine, and wherein the method further comprises:
   determining differences between the cylinder-specific deviations of the inlet valve lift are determined, and
   determining a control variable for the minimum lift of the inlet valves to be set by the valve train base at least on the determined differences.

5. The method of claim 1, wherein the cylinder-specific deviations of the inlet valve lift are taken into account for cylinder-specific fuel delivery.

6. A control device for an internal combustion engine with a plurality of inlet valves and a device for varying the lift of the inlet valves, wherein the control device is programmed to control a variable valve train of an internal combustion engine with a plurality of cylinders by:
   determining an intake air quantity at a first operating point of the internal combustion engine,
   at the first operating point, determining cylinder-specific values for a reduction of the fuel quantity by successively reducing the respective delivered quantity of fuel for each cylinder until a parameter representing the uneven running of the internal combustion engine has reached a specified uneven running limit value,
   determining a ratio of a change of the inlet valve lift to a resulting change of the intake air quantity for the first operating point,
   determining cylinder-specific deviations of the inlet valve lift from a valve reference value based on the ratio, the intake air quantity at the first operating point, and the associated fuel quantity reduction value, and
   controlling the variable valve train based on at least one of the cylinder-specific deviations of the inlet valve lift.

7. The control device of claim 6, further programmed to:
   at a second operating point of the internal combustion engine, at which the inlet valve lift is greater than at the first operating point, determine other cylinder-specific values for a reduction of fuel quantity by successively reducing the respective quantity of fuel delivered for each cylinder until a parameter representing the uneven running of the internal combustion engine has reached a specified uneven running limit value, and
   determine cylinder-specific errors in the fuel delivery based on the other cylinder-specific values for the reduction of fuel quantity and a fuel reference value, and
   wherein the cylinder-specific errors in the fuel delivery are taken into account during determination of the cylinder-specific values of the reduction of the fuel quantity at the first operating point.

8. The control device of claim 6, wherein the valve train of the internal combustion engine is configured for cylinder-specific control of the lift of the inlet valves of the internal combustion engine and the valve train is controlled such that the cylinder specific deviations of the inlet valve lift are reduced or approach each other.

9. The control device of claim 6, wherein the valve train of the internal combustion engine is configured for common control of the lift of the inlet valves of the internal combustion engine, and wherein the control device is further programmed to:
   determine differences between the cylinder-specific deviations of the inlet valve lift are determined, and
   determine a control variable for the minimum lift of the inlet valves to be set by the valve train based at least on the determined differences.

10. The control device of claim 6, wherein the cylinder-specific deviations of the inlet valve lift are taken into account for cylinder-specific fuel delivery.

\* \* \* \* \*